United States Patent
DeGroot

(10) Patent No.: US 9,151,357 B2
(45) Date of Patent: Oct. 6, 2015

(54) LOW FRICTION, DIRECT DRIVE CONVEYOR BELT

(75) Inventor: Michael DeGroot, Grand Rapids, MI (US)

(73) Assignee: Thermodrive, LLC, Grand Rapids, MI (US)

(*) Notice: Subject to any disclaimer, the term of this patent is extended or adjusted under 35 U.S.C. 154(b) by 773 days.

(21) Appl. No.: 12/943,974

(22) Filed: Nov. 11, 2010

(65) Prior Publication Data

US 2011/0048903 A1    Mar. 3, 2011

Related U.S. Application Data

(62) Division of application No. 11/814,342, filed as application No. PCT/US2006/002013 on Jan. 19, 2006, now Pat. No. 7,850,562.

(60) Provisional application No. 60/593,493, filed on Jan. 19, 2005.

(51) Int. Cl.
*F16H 7/02* (2006.01)
*F16G 1/28* (2006.01)
*B65G 15/26* (2006.01)
*B65G 23/06* (2006.01)

(52) U.S. Cl.
CPC ........... *F16G 1/28* (2013.01); *B65G 15/26* (2013.01); *B65G 23/06* (2013.01); *F16H 7/023* (2013.01); *B65G 2201/0202* (2013.01)

(58) Field of Classification Search
USPC .......................... 474/153; 198/813–816, 834
IPC .................................... F16H 7/02; B65G 15/42
See application file for complete search history.

(56) References Cited

U.S. PATENT DOCUMENTS

| | | | |
|---|---|---|---|
| 2,570,364 A | 11/1948 | Mercier | |
| 3,015,381 A | 1/1962 | Mohwinkel et al. | |
| 3,083,583 A | 4/1963 | Szonn | |
| 3,184,037 A * | 5/1965 | Greaves et al. | 209/241 |
| 3,334,524 A * | 8/1967 | Chalk | 474/205 |
| 3,528,537 A | 9/1970 | Shultz et al. | |
| 3,977,265 A | 8/1976 | Worley et al. | |
| 4,047,444 A | 9/1977 | Jeffrey | |

(Continued)

FOREIGN PATENT DOCUMENTS

| | | |
|---|---|---|
| DE | 10 77 938 B | 3/1960 |
| DE | 37 24 564 A1 | 2/1989 |

(Continued)

OTHER PUBLICATIONS

Osako Nobutaka et al., JP2001-56043A, English translation, published Feb. 27, 2001.

*Primary Examiner* — Anna Momper
*Assistant Examiner* — San Aung
(74) *Attorney, Agent, or Firm* — McGarry Bair PC

(57) ABSTRACT

A thermoplastic endless belt has a smooth outer surface substantially free of discontinuities and an inner surface with a plurality of teeth at a given belt pitch. The teeth are adapted to engage a pulley with circumferentially spaced sheaves at a pulley pitch greater than the belt pitch. The belt is slightly stretchable so that the pulley can drive the endless belt when engaging the teeth within a range of load on the belt. Means are provided to minimize friction between the belt and the drive pulley. Also, a position limiter ensures that the driven tooth stays engaged optimally with the drive sheave.

15 Claims, 8 Drawing Sheets

(56) References Cited

U.S. PATENT DOCUMENTS

| | | |
|---|---|---|
| 4,170,281 A | 10/1979 | Lapeyre |
| 4,337,672 A | 7/1982 | Shiber |
| 4,634,409 A | 1/1987 | Johnson et al. |
| 4,720,008 A | 1/1988 | Ufland |
| 4,995,506 A * | 2/1991 | Langenbacher et al. ...... 198/814 |
| 5,017,969 A * | 5/1991 | Mitomi et al. ................ 399/299 |
| 5,037,360 A | 8/1991 | Fujiwara et al. |
| 5,074,406 A | 12/1991 | Gundlach et al. |
| 5,498,214 A | 3/1996 | Macchiarulo et al. |
| 5,653,656 A | 8/1997 | Thomas et al. |
| 5,662,541 A | 9/1997 | Roovers |
| 5,697,491 A | 12/1997 | Alex |
| 5,755,315 A * | 5/1998 | Wallbaum et al. ............ 198/331 |
| 5,911,307 A | 6/1999 | Kraft et al. |
| 6,039,964 A | 3/2000 | Sanduja et al. |
| 6,315,105 B1 * | 11/2001 | Gibbs et al. ................... 198/497 |
| 6,419,775 B1 | 7/2002 | Gibson et al. |
| 6,564,932 B2 | 5/2003 | Itoh |
| 6,571,937 B1 * | 6/2003 | Costanzo et al. .............. 198/779 |
| 6,758,734 B2 | 7/2004 | Braunschweig et al. |
| 2001/0031680 A1 | 10/2001 | Schempf et al. |
| 2002/0182419 A1 * | 12/2002 | Cho et al. ................... 428/423.1 |
| 2004/0089519 A1 | 5/2004 | Pollak et al. |
| 2006/0011453 A1 | 1/2006 | Sedlacek |
| 2006/0081449 A1 | 4/2006 | Gundlach |

FOREIGN PATENT DOCUMENTS

| | | | |
|---|---|---|---|
| DE | 42 26 999 A1 | 7/1994 | |
| DE | 94 16 294 | 1/1995 | |
| EP | 1 405 717 A1 | 4/2004 | |
| GB | 2 349 113 A | 10/2000 | |
| JP | 11311304 | 11/1999 | |
| JP | 2001056043 A * | 2/2001 | ................ F16G 1/28 |
| JP | 2005-522634 A | 7/2005 | |
| WO | 03/048603 A2 | 6/2003 | |
| WO | 03/076311 A1 | 9/2003 | |
| WO | 2004/011822 A1 | 2/2004 | |

* cited by examiner

LOW FRICTION, DIRECT DRIVE CONVEYOR BELT

CROSS REFERENCE TO RELATED APPLICATIONS

This application is a divisional of U.S. patent application Ser. No. 11/814,342, filed Jul. 19, 2007, now U.S. Pat. No. 7,850,562, issued Dec. 14, 2010, which is a National Phase Patent Application of PCT/US2006/002013, filed Jan. 19, 2006, which claims the benefit of U.S. Provisional Patent Application No. 60/593,493, filed Jan. 19, 2005, all of which are incorporated herein in their entirety.

BACKGROUND OF THE INVENTION

1. Field of the Invention

This invention relates to endless belts for conveyors and, more particularly, to thermoplastic, toothed endless belts driven by pulleys.

2. Description of the Related Art

Low tension, direct drive conveyor belts are often used in situations where hygiene and cleanliness are critically important. For example, in food processing plants such as those that process meat products for human consumption, low tension, direct drive belt conveyors are used to transport items. Sanitation is critically important and, therefore, the endless belts used in such conveyors are conventionally made of materials that can be hygienically cleaned.

It is known to use thermoplastic belts with a smooth continuous surface on one side and teeth on the other side adapted to engage grooves or sheaves in a drive pulley, as shown for example in U.S. Pat. No. 5,911,307. But such a thermoplastic belt has characteristics of both a flat, stretchable belt that might be typically driven by a friction pulley, and a toothed belt driven by a drive pulley. These characteristics reflect the two basic ways that a drive pulley can transmit torque to the belt. In a flat belt, torque is transmitted to the belt through friction between the drive pulley surface and the adjacent surface of the belt. The effectiveness of this type of drive is a function of belt tension (both initial pretension and the tension generated due to the product load) and the coefficient of friction of the material of the belt surface and the material of the pulley surface. A friction driven flat belt is subject to contaminants that can affect the coefficient of friction. Moreover, elongated belts typically stretch over time and under load and such stretching can affect its tension. A thermoplastic belt in particular can stretch 3% of its length or more.

For these reasons, direct drive belts are preferred in such facilities as food handling operations. In an ideal toothed belt, torque is transmitted to the belt through the contact of a face of a tooth or recess on the pulley to a face of a tooth or recess on the belt. But the use of a thermoplastic toothed belt as a direct drive belt with a pulley introduces problems, primarily because of the elasticity of the belt.

Because a thermoplastic belt stretches under load, the belt teeth may not always mate with the pulley recesses or sheaves as the belt wraps around the pulley. Prior solutions have determined that the tooth pitch of the belt must be less than the pitch of the drive pulley at less than maximum elongation of the belt. Also, the pulley pitch must equal the pitch of the belt at maximum elongation, give or take a fraction of a percent. Moreover, to ensure that the belt teeth are positioned to enter the pulley sheaves, the width of each sheave in the pulley must exceed the belt tooth width at least by the amount of distance generated by elongating the belt the maximum allowable amount over the span of the belt wrap.

Yet problems remain in ensuring that the belt teeth stay engaged with the pulley sheaves over the full range of belt elongation and load in the field. Due to the necessary pitch difference between the belt and the pulley, only one belt tooth will be driven by a pulley sheave at any given moment. It has been found that this engaged tooth is always the tooth that is about to exit the pulley. For all subsequent belt teeth that engage the pulley sheaves at any given moment, there is a gap between the face of the belt tooth and the face of the pulley sheave, and that gap progressively increases in size for each successive tooth. The size of these gaps are a function of belt tension, in that each respective gap is largest when the belt has minimum tension and smallest when the belt is at maximum tension. If the belt tension exceeds a predetermined maximum, the entry tooth will no longer sit properly in the pulley sheave and effective drive characteristics will be lost. In other words, the pulley may rotate while the belt slips until a tooth engages again.

It can be seen that as the exiting tooth disengages from the drive pulley there remains some amount of gap between the following belt tooth and the face of its respective pulley sheave. Therefore, discounting any momentum of the belt and any friction between the belt and the pulley, the belt will effectively stop for a brief moment until the following sheave re-engages the new "exit tooth". For this brief moment no torque is transmitted from the pulley to the belt and thus the belt speed is temporally retarded.

This motion causes a slight amount of vibration and noise in the system. Vibration increases in frequency as pulley tooth pitch is reduced and/or pulley rotation speed is increased. It may be nearly undetectable in belt applications with a small tooth pitch and a large amount of mass for damping, such as when large product loads approach a predetermined maximum for belt elongation. But for many applications, particularly where loads are light and/or belt speed is slower, the resultant vibration and noise may be unacceptable.

Nevertheless some slip between the belt and the pulley is what enables a direct drive application to work. This temporary disengagement of belt teeth from pulley sheaves causes the average belt speed to be less than the average pulley speed. In fact, the average belt speed is less than the pulley speed by the percentage of elongation that is still available in the belt (max elongation—current elongation). Because of this necessary slip, any characteristics of a flat belt drive will compromise the benefits of direct drive, e.g. friction. Friction between the belt and the pulley will retard slippage and may cause the trailing tooth to miss the pulley sheave altogether.

Another problem occurs when the belt is under virtually no tension. In some application such as a horizontally positioned conveyor, the weight of the lower span of the belt tends to pull the teeth at the exit point out of the respective pulley sheave. The critical area of belt wrap around the pulley is the short distance between the exit point and one pulley sheave pitch back. If the belt tooth remains engaged through this arc then proper drive will be achieved, but if not, belt teeth will "pop" and the driving dynamics will become uncontrolled.

SUMMARY OF THE INVENTION

In one aspect, a direct drive conveyor includes an endless belt and one or more drive pulleys. The belt or the drive pulley has teeth at a given pitch and the other of the belt or the drive pulley has recesses at a different pitch such that the pulley pitch is greater than the belt pitch. The recesses are adapted to receive the teeth as the belt wraps around the drive pulley to an exit point. The conveyor also includes means to minimize friction between the belt and the drive pulley wherein only one tooth or recess on the belt at a time is driven by a corresponding drive recess or tooth on the drive pulley so that the belt can slip relative to the drive pulley after the driven tooth or recess on the belt exits its corresponding drive recess or tooth on the drive pulley at the exit point. The minimizing means includes minimal surface contact between the belt and the drive pulley.

In another aspect, a direct drive conveyor includes an endless belt and one or more drive pulleys. The belt or the drive pulley has teeth at a given pitch and the other of the belt or the drive pulley has recesses at a different pitch such that the pulley pitch is greater than the belt pitch. The recesses are adapted to receive the teeth as the belt wraps around the drive pulley to an exit point. The conveyor also includes means to minimize friction between the belt and the drive pulley wherein only one tooth or recess on the belt at a time is driven by a corresponding drive recess or tooth on the drive pulley so that the belt can slip relative to the drive pulley after the driven tooth or recess on the belt exits its corresponding drive recess or tooth on the drive pulley at the exit point. The conveyor also includes an idler spaced from the at least one drive pulley wherein the idler is a stationary disk that bears against the belt.

In another aspect, a direct drive conveyor includes an endless thermoplastic belt and one or more drive pulleys. The belt or the drive pulley has teeth and the other of the belt or the drive pulley has recesses adapted to receive the teeth as the belt wraps around the pulley. The drive pulley and the belt having different pitches, and minimal friction between them so that the belt is driven by one tooth at a time. The conveyor also includes means to retain the belt against the pulley at the driven tooth for a distance more than the length of one pulley pitch.

Another aspect is a method of driving an endless belt in a conveyor having one drive pulleys. The belt or the drive pulley has teeth and the other of the belt or the drive pulley has recesses adapted to receive the teeth as the belt wraps around the pulley to an exit point. The drive pulley and the belt having different pitches such that the pulley pitch is greater than the belt pitch. The method includes causing the drive pulley to rotate so that only one tooth or recess on the belt at a time is driven by a corresponding drive recess or tooth on the drive pulley, enabling the belt to move at an average speed less than the average speed of the drive pulley, and providing minimal friction between the belt and the drive pulley to enable the belt to slip relative to the drive pulley when the drive tooth is disengaged from the drive sheave.

DETAILED DESCRIPTION

Figure 1:
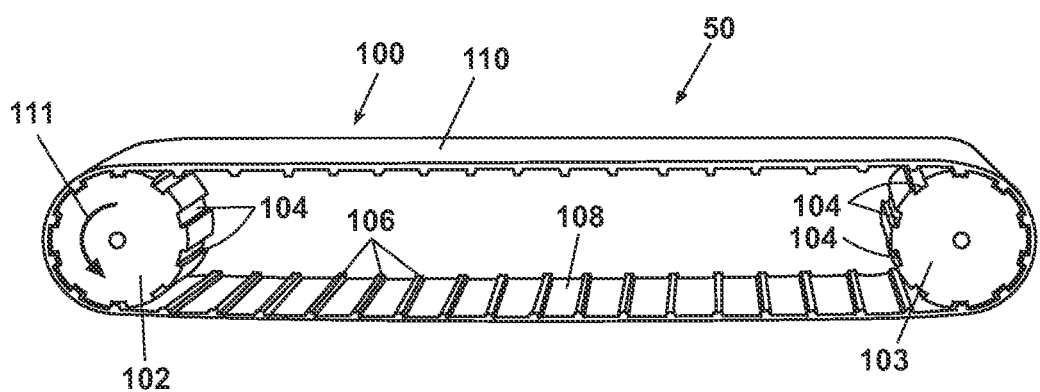
FIG. 1 is a perspective side view of a prior art belt installed between two pulleys.
Figure 2:
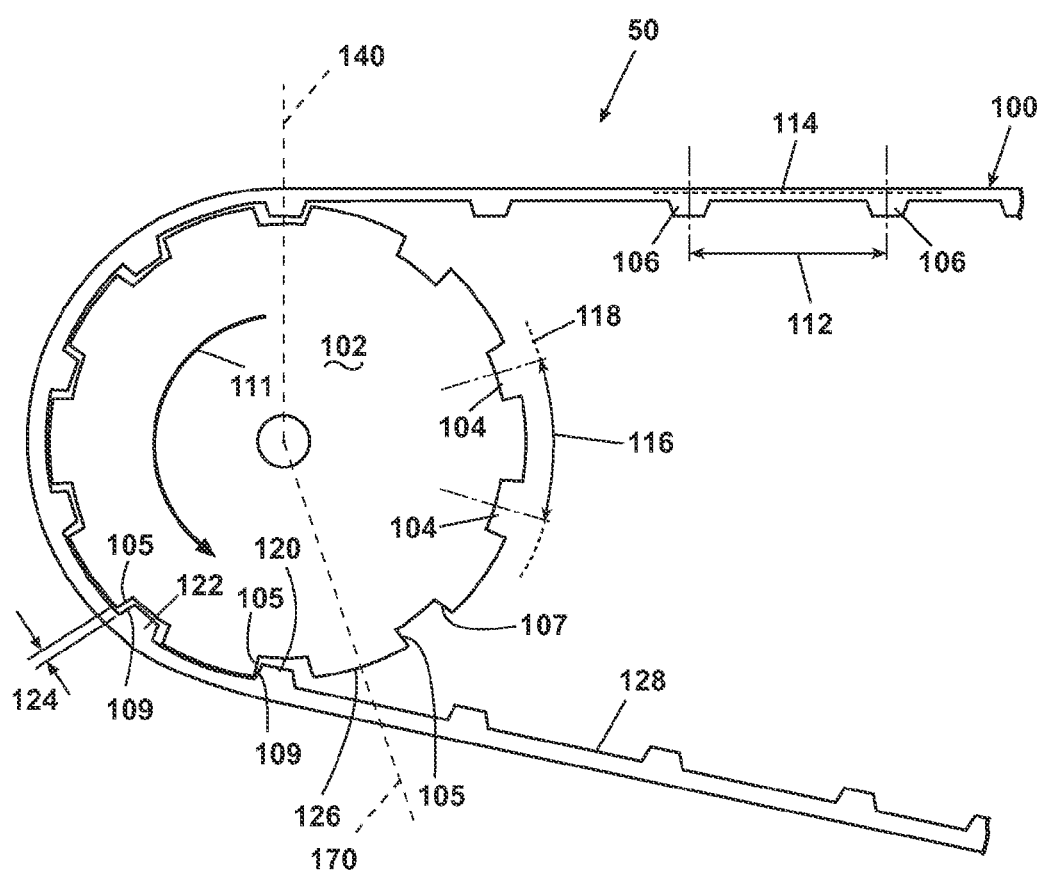
FIG. 2 is an enlarged view in elevation of a portion of FIG. 1.

Some problems with known thermoplastic direct drive belts are shown in a direct drive conveyor 50 of FIGS. 1 and 2. An endless belt 100 is seen in FIG. 1 in a typical installation between two pulleys 102 and 103. The pulleys 102, 103 are conventional and they can be any of a number of different forms and sizes. Each pulley 102 or 103 has a number of transverse grooves or sheaves 104 spaced around its circumference. Each sheave 104 has a driving face 105 and an opposed, non-driving face 107. The belt 100 has a plurality of teeth 106 equidistantly spaced from each other on the inside surface 108 of the belt, each tooth having a driving surface 109. The teeth 106 engage the sheaves 104 of each pulley as the belt wraps around the pulley. At least one pulley, e.g. pulley 102, is a drive pulley; the other 103 can be an idler or slave pulley. In this configuration, the upper span of the belt will carry loads as the belt 100 travels in the direction of arrow 111. The belt 100 has an outside surface 110 that is fairly smooth and free of discontinuities, typically made of a thermoplastic material such as Pebax® resin, polyester or polyurethane.

The belt 100 has a pitch 112 defined as the distance between the centerlines of adjacent teeth 106. The belt pitch 112 is measured along a belt pitch line 114, which corresponds to the neutral bending axis of the belt. As the belt 100 bends around the pulley 102, the neutral bending axis is that imaginary plane on one side of which the belt material is under compression and on the other side of which the belt material is under tension.

Similarly, the pulley pitch 116 is the arc length between the centerlines of adjacent sheaves 104, measured along the pulley's pitch circle 118. The pulley pitch circle 118 in this case corresponds to the belt pitch line 114 as the belt 100 wraps around the pulley 102. In other words, the pulley pitch circle 118 will have the same radius as the belt pitch line 114 as the belt wraps around the pulley.

As noted above, the exit tooth 120 will be the drive tooth as its driving surface 109 contacts the driving surface 105 of the sheave 104 that has received the exit tooth. The trailing tooth 122 nests in its corresponding sheave 104, but there is a gap 124 between the tooth driving surface 109 and the sheave driving surface 105. Also, the pulley surface 123 between adjacent sheaves may engage the surface 128 of the belt 100 between adjacent teeth 106. The problems arising from this structure are explained above. Friction between the surface 126 on the pulley and the surface 128 on the belt adds a force component that interferes with the relative movement between the belt and the pulley, possibly causing the teeth not to engage the appropriate sheaves on the pulley. And any friction is enhanced when the belt is placed under tension. The normal and customary response in the field to a belt slipping on the pulley is to increase tension. But this serves only to render the direct drive ineffective. On the other hand, when the belt is under no tension, and the conveyor is horizontal, the weight of the lower belt span tends to pull the driven tooth from its pulley sheave prematurely, adversely affecting the direct drive dynamics.

Figure 3A:
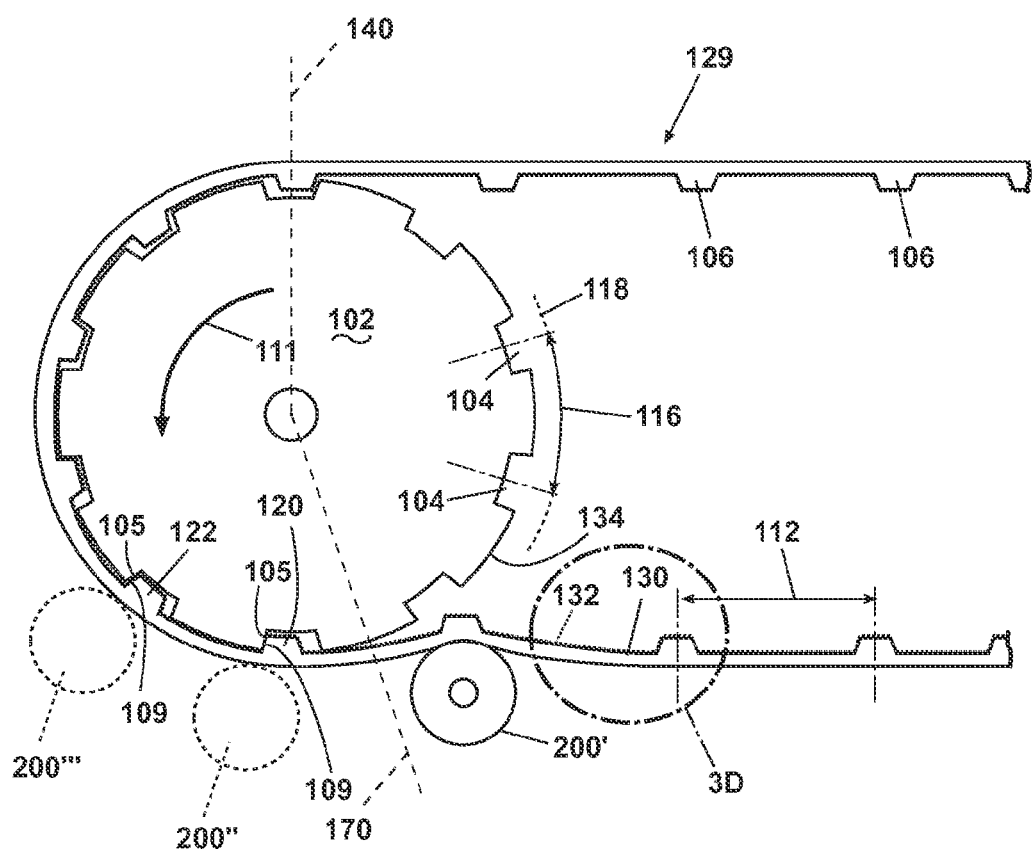
FIG. 3A is a view similar to FIG. 2 showing a conveyor according to the invention.
Figure 3B:
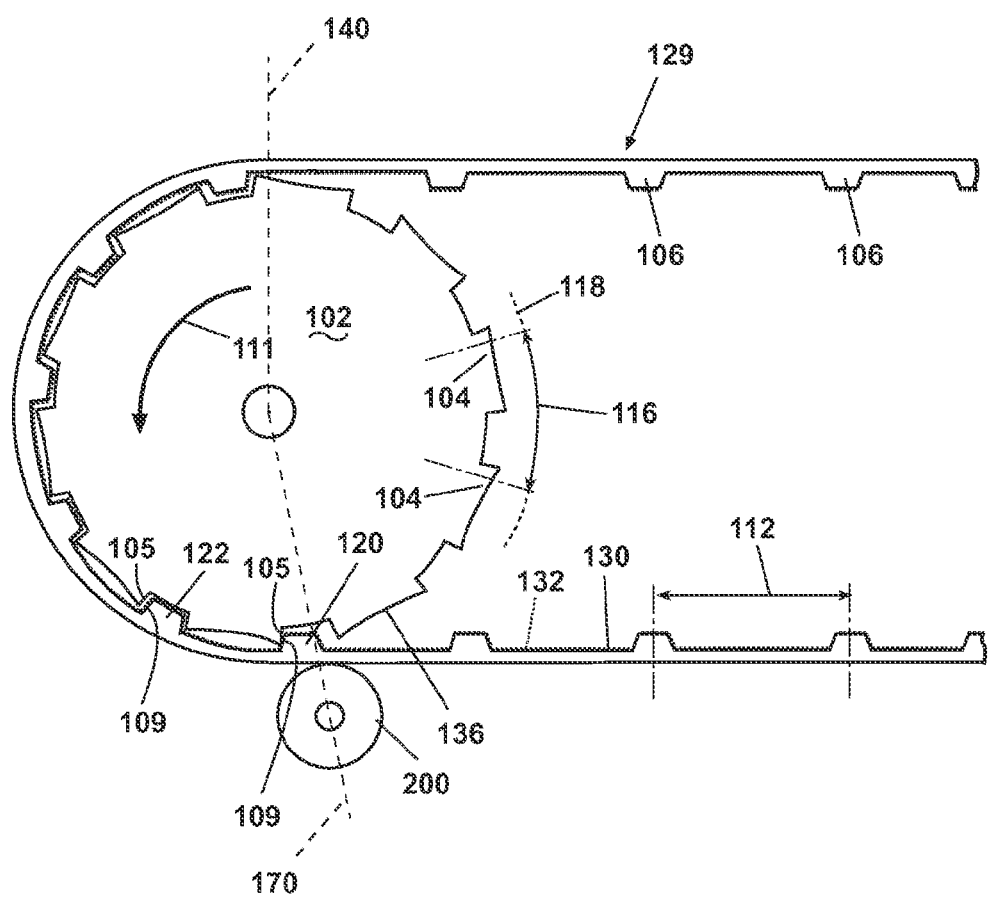
FIG. 3B is a view similar to FIG. 3 showing another aspect of a conveyor according to the invention.
Figure 3C:
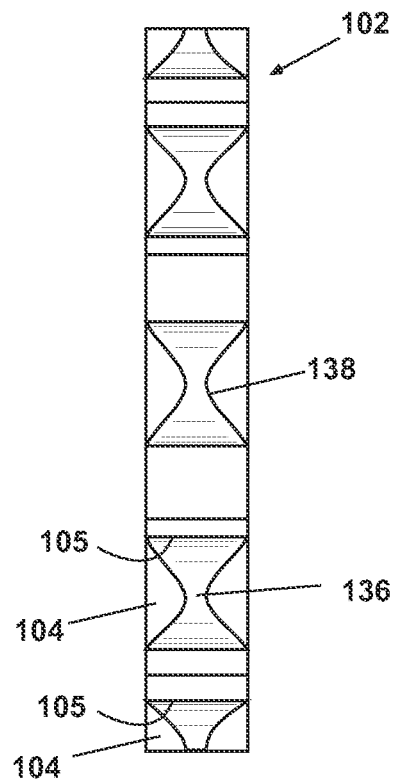
FIG. 3C is an end view of the drive pulley of FIG. 3A.
Figure 3D:
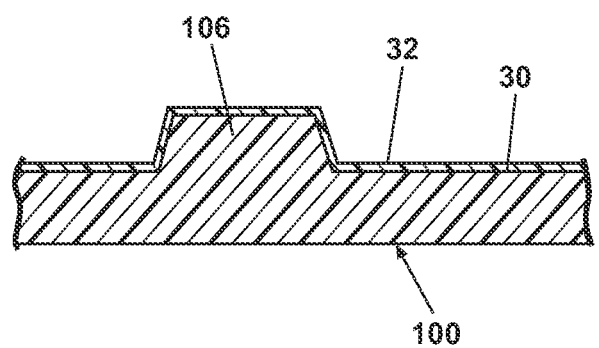
FIG. 3D is an enlarged cross sectional view of a portion of the belt in FIG. 3A.

One aspect of the invention is shown in FIGS. 3*a*-3*c* where a direct drive conveyor 129 has all the structure of the prior art system shown in FIGS. 1 and 2, plus characteristics of the invention. Accordingly, components in the inventive conveyor that are the same as components in the prior art conveyors of FIGS. 1 and 2 bear like references. In one aspect of the invention, the pulley and belt are designed to permit minimal friction between them. The surface 130 of the belt between adjacent teeth, and optionally including the teeth 106, can be coated with a friction reducing material 132, e.g. polytetrafluoroethylene (PTFE), also known as Teflon®. In addition, or alternatively, the surface 134 between adjacent sheaves on the pulley can be coated with a friction reducing material. As well, the pulley will preferably have minimal surfaces contacting the belt anywhere but on the belt tooth surfaces. For example, the supporting structure such as the surface 136 between adjacent sheaves can be recessed from the perimeter of the pulley as shown in FIG. 3b. It can also have a narrower neck 138 to reduce surface contact with the belt (See FIG. 3c).

Another aspect of the invention pertains primarily to any application where the span exiting the drive pulley tends to pull the driven tooth from the drive sheave. The most common situation would be where the belt is run horizontally and the weight of the return span of the belt exiting the drive pulley tends to form a catenary curve, and consequently tends to urge the driven tooth out of the drive sheave prematurely, i.e., before an optimum exit point 170 as shown in FIG. 2. If top dead center 140 is defined as a point of rotation of the pulley where a sheave 104 is centered on a line extending from the center 142 of the pulley, then the optimum exit point 170 is preferably when the drive sheave on the pulley is on a line slightly more than 180° from top dead center in the direction of rotation. As shown in FIGS. 3a and 3b, a position limiter 200 is disposed near the exit point 170, i.e., the point where the exit tooth 120 of the belt optimally leaves the corresponding sheave of the pulley. One preferred location, as shown in FIG. 3b, places the position limiter 200 adjacent the pulley at the exit point 170 of the belt tooth. One alternative location, as shown in FIG. 3a, includes a position limiter 200' just past the exit point 170. In this case, the position limiter deflects the belt enough to ensure that the tooth does not prematurely exit the sheave. Other alternative locations, shown in phantom) are at 200'' immediately prior to the exit point 170 and 200' at the next succeeding tooth 122. Preferably, the position limiter 200 will be disposed in such a manner that the belt can not lift off the pulley more than 25% of the tooth height until the exit point 170.

The position limiter 200 can be a belt-width roller, as shown, or it can be multiple rollers, such as a pair with one on each edge of the belt. Alternatively the position limiter can be one or more arms or points bearing against the belt, preferably with friction reducing wear pads. Further, the position limiter can be a scraper bar bearing against the belt that will serve two functions, to wit: maintaining the exit tooth within the sheave of the pulley and cleaning the belt as it exits the pulley. The position limiter 200 need not extend across the belt. It need only be positioned to maintain the belt against the pulley or pulleys until the driven tooth is timely released from the respective sheave.

Figure 4:
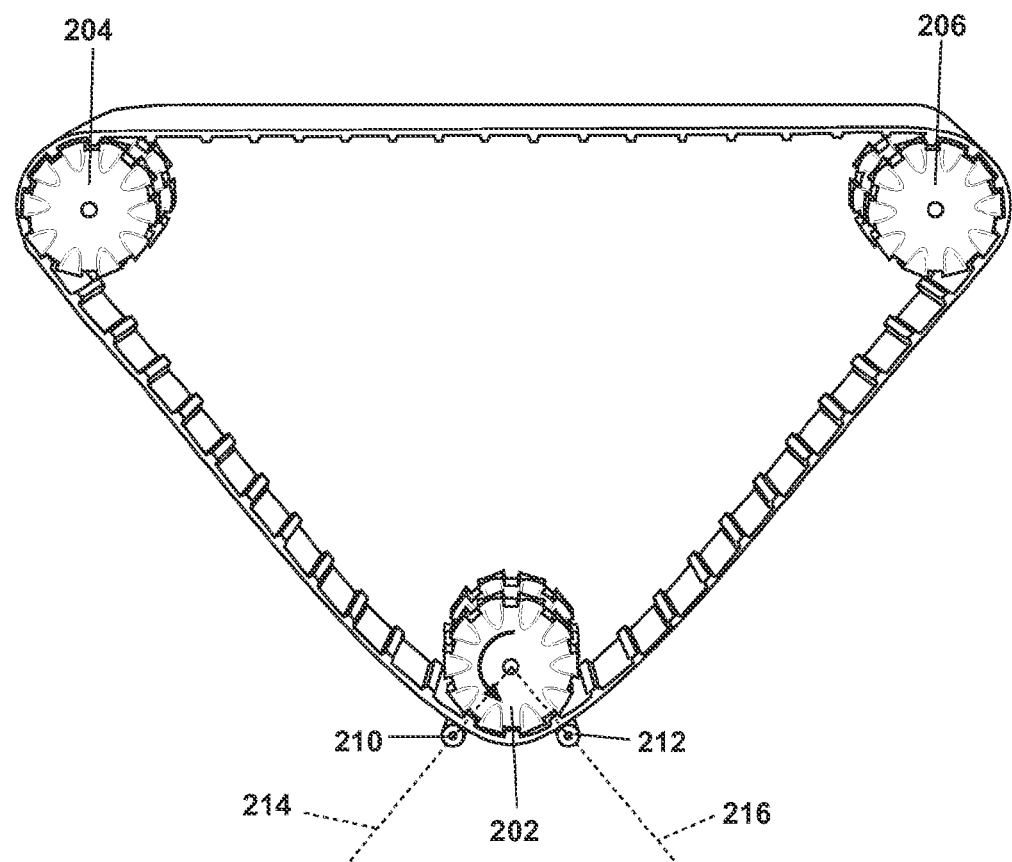
FIG. 4 is a view of a center drive belt system according to the invention.

An alternative embodiment of a direct drive thermoplastic belt conveyor, according to the invention, is shown in FIG. 4. The system has a center drive pulley 202 and two idler pulleys 204, 206 with an endless belt 208. In accordance with the invention, two position limiters 210, 212 are used with the drive pulley 202. One limiter 210 is placed near the entry point 214 where the belt tooth enters engagement with the pulley sheave. The other limiter 212 is placed near the exit point 216. Preferably, the belt wrap is minimized such that only three teeth are wrapped at any time.

A center drive such as this solves the problems associated with any "flat belt drive" component of the system, such as might be caused by friction between the belt an the pulley for example. As explained above, friction can cause the belt entry tooth to advance relative to the pulley tooth and thus "skip". This might occur, for example, when the friction force between the belt and the pulley generates a higher speed component than the driving force of the tooth drive surface against the pulley drive surface. Minimizing the amount of wrap also tends to reduce the opportunity for friction between the belt and the pulley.

It has been found that if any of the pulleys are not drive pulleys, the speed of the idler pulley can cause problems. The drive pulley is generally traveling at a greater speed than the belt speed. If the same geometry was used for the idler pulley as the drive pulley then, for proper tooth engagement, the idler pulley would have to travel at the same speed as the drive pulley. But the idler pulley cannot travel any faster than the belt, inasmuch as the belt drives the idler pulley. Therefore the idler pulley must have a different pitch than the drive pulley (different geometry). Preferably, the idler pulley pitch will be less than or equal to the pitch of an un-tensioned belt. Consequently, as the belt pitch changes with elongation, the idler pulley will be compelled to go slower than the belt. Just as in the drive pulley, the width of the sheaves must exceed the belt tooth width such that there is enough gap to allow for the added length of belt that will occur at the maximum belt tension over the span of belt wrap.

Figure 5:
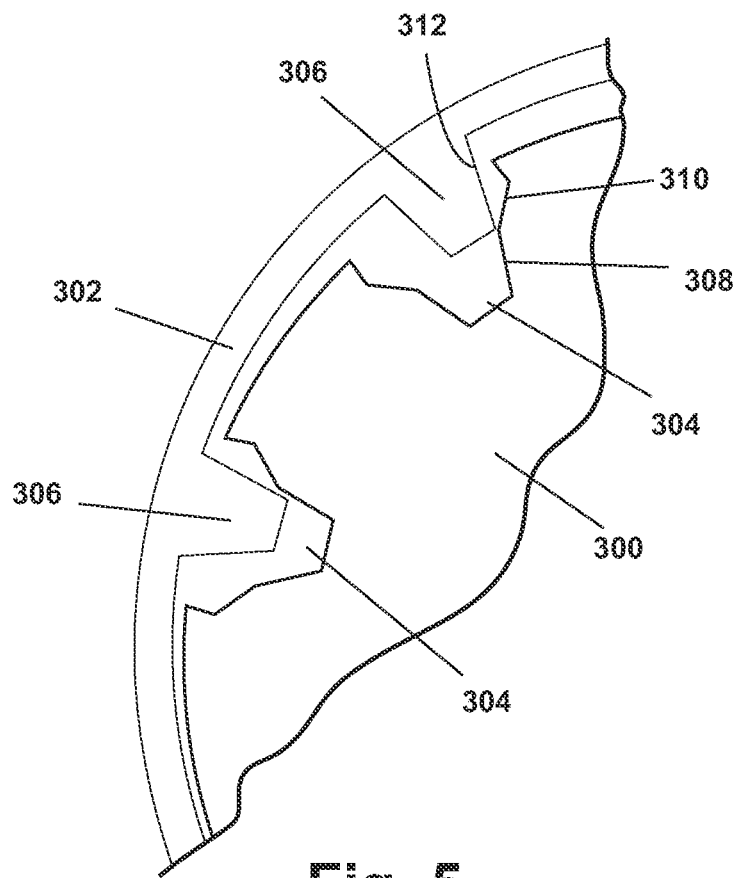
FIG. 5 is a fractional side view of a belt and pulley showing an alternative sheave construction according to the invention.

The idler pulley will primarily be driven as by a flat belt because of its low drag characteristics. This will cause the entry tooth on an elongated belt to not ideally engage a sheave on the idler pulley. To overcome this problem, the coefficient of friction must be minimized as explained earlier. In addition, the angle of the tooth contact face can be designed such that at maximum elongation of the belt, the tip of the belt tooth will contact the pulley sheave driving surface at some point. This will allow the belt tooth to slowly engage the pulley sheave while slowing the idler pulley down until the proper engagement is made. An example is shown in FIG. 5 where an idler pulley 300 is driven by a belt 302. Sheaves 304 in the pulley 300 are driven by teeth 306 on the belt 302. To ensure that each tooth 306 properly engages the corresponding sheave 304, the side of the sheave has two walls at different angles. The lower wall portion 308 is at a steeper angle than the upper wall portion 310. Preferably, the upper wall portion is at an angle wider than the angle of the belt tooth 306. This works since the added distance that must be accommodated is only generated over the span of one tooth pitch for the previous tooth will have already engaged the idler.

Figure 6:
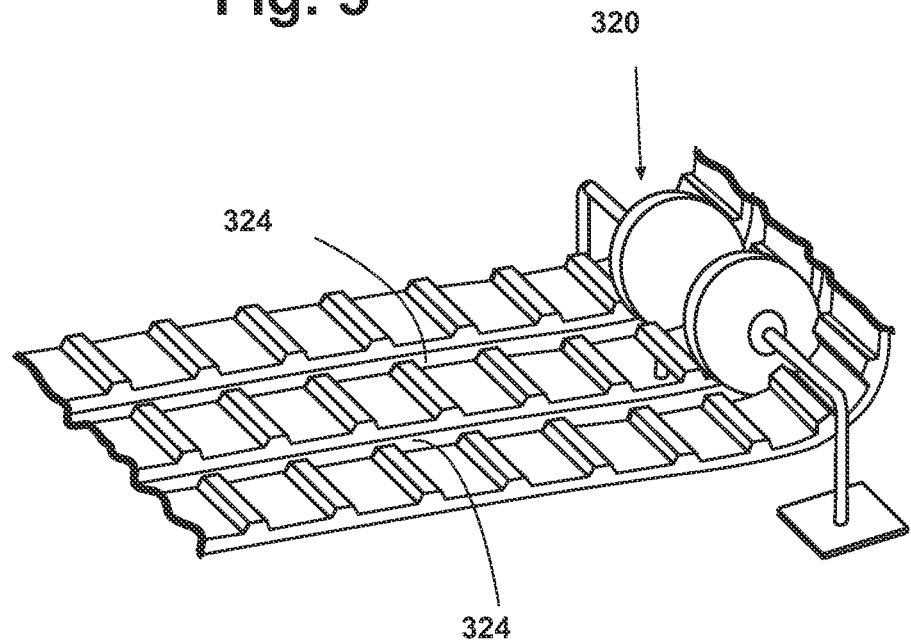
FIG. 6 is a fractional perspective view of one embodiment of an idler according to the invention.

Another option shown in FIG. 6 is for an idler 320 to comprise a stationary disk 322 or arm that the belt simply slides against. Preferably, the portion of disk 322 bearing against the belt is covered with a friction reducing coating as set forth above. While this structure may increases friction somewhat between the belt and the idler, it is of little consequence since there is no toothed drive between the belt and the idler. To accommodate these disks longitudinal grooves 324 are provided through the teeth on the toothed side of the belt at set increments to enable the belt to move smoothly over the stationary disks. Using these disks eliminates the complications of idler pulley geometry as well as functioning as effective tracking devices. Further, by being stationary the belt will not have a tendency to "climb up" these disks as it would if the smooth pulleys were rotating.

Figure 7:
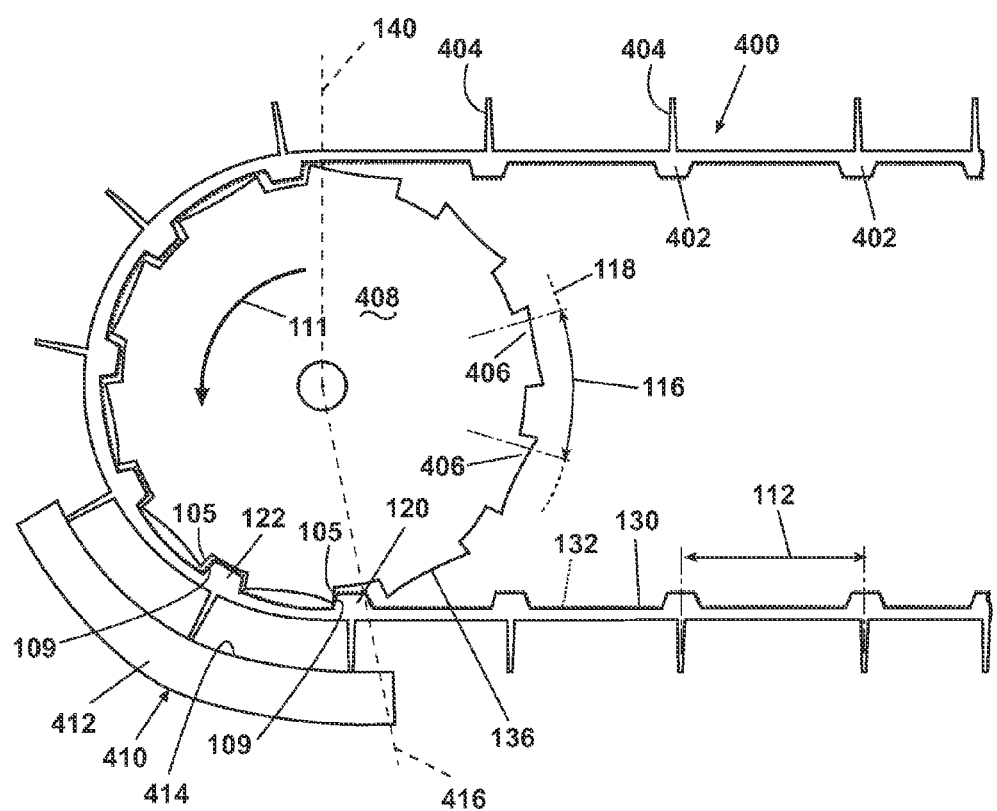
FIG. 7 is a view similar to FIG. 3 showing another aspect of a conveyor according to the invention.

It is known for belts to sometimes be fitted with cleats extending upwardly from the smooth surface to help retain or separate objects on the belt. In such an application, the invention contemplates using the cleats to advantage as a position limiter. FIG. 7 illustrates one such application. An endless thermoplastic belt 400 has teeth 402 on one side and cleats 404 on the other side. The belt teeth 402 are sequentially driven by recesses or sheaves 406 on a drive pulley 408. A position limiter 410 comprises a shoe 412 having an inner curved surface 414. At least a portion of the curved surface is disposed near the optimum exit point 416 so that the shoe bears against the cleats, which, in turn, urge the belt against the pulley 408 to keep the driven tooth 402 engaged to the exit point.

While the invention has been specifically described in connection with certain specific embodiments thereof, it is to be understood that this is by way of illustration and not of limitation, and the scope of the appended claims should be construed as broadly as the prior art will permit. For example, instead of teeth on the belt and sheaves on the pulley, the belt can have holes or recesses and the pulley can have teeth or pins in the manner of a sprocket to engage the holes or recesses in the belt, and the principles of the present invention equally apply.

I claim:

1. A direct drive conveyor comprising:
   an endless belt;
   at least one drive pulley wherein one of the belt and the at least one drive pulley has teeth at a given pitch and the other of the belt and the at least one drive pulley has recesses at a different pitch such that the pulley pitch is greater than the belt pitch, wherein the recesses are adapted to receive the teeth as the belt wraps around the at least one drive pulley to an exit point;
   means to minimize friction between the belt and the at least one drive pulley wherein only one tooth or recess on the belt at a time is driven by a corresponding drive recess or tooth on the at least one drive pulley so that the belt can slip relative to the at least one pulley after the driven tooth or recess on the belt exits its corresponding drive recess or tooth on the at least one drive pulley at the exit point; and
   wherein the minimizing means comprises minimal surface contact between the belt and the drive pulley.

2. A direct drive conveyor comprising:
   an endless belt;
   at least one drive pulley wherein one of the belt and the at least one drive pulley has teeth at a given pitch and the other of the belt and the at least one drive pulley has recesses at a different pitch such that the pulley pitch is greater than the belt pitch, wherein the recesses are adapted to receive the teeth as the belt wraps around the at least one drive pulley to an exit point;
   means to minimize friction between the belt and the at least one drive pulley wherein only one tooth or recess on the belt at a time is driven by a corresponding drive recess or tooth on the at least one drive pulley so that the belt can slip relative to the at least one pulley after the driven tooth or recess on the belt exits its corresponding drive recess or tooth on the at least one drive pulley at the exit point;
   an idler spaced from the at least one drive pulley; and
   wherein the idler is a stationary disk that bears against the belt.

3. A direct drive conveyor comprising:
   an endless thermoplastic belt;
   at least one drive pulley wherein one of the belt and the pulley has teeth and the other of the belt and the pulley has recesses adapted to receive the teeth as the belt wraps around the pulley; and
   the drive pulley and the belt having different pitches, and minimal friction between them so that the belt is driven by one tooth at a time;
   and means to retain the belt against the pulley at the driven tooth for a distance more than the length of one pulley pitch.

4. A direct drive conveyor according to claim 3 wherein the means to retain the belt against the pulley comprises a position limiter disposed against the belt near the pulley.

5. The direct drive conveyor of claim 4 wherein the position limiter is a roller.

6. The direct drive conveyor of claim 4 wherein the position limiter is an arm bearing against the belt.

7. The direct drive conveyor of claim 4 wherein the position limiter is a scraper bar.

8. The direct drive conveyor of claim 4 wherein the position limiter is a shoe.

9. The direct drive conveyor according to claim 3 further comprising an idler spaced from the drive pulley.

10. A method of driving an endless belt in a conveyor having at least one drive pulley, wherein one of the belt and the at least one drive pulley has teeth and the other of the belt and the at least one drive pulley has recesses adapted to receive the teeth as the belt wraps around the pulley to an exit point and wherein the at least one drive pulley and the belt have different pitches such that the pulley pitch is greater than the belt pitch, the method comprising:
    causing the at least one drive pulley to rotate so that only one tooth or recess on the belt at a time is driven by a corresponding drive recess or tooth on the at least one drive pulley,
    enabling the belt to move at an average speed less than the average speed of the at least one drive pulley, and
    providing minimal friction between the belt and the drive pulley to enable the belt to slip relative to the drive pulley when the drive tooth is disengaged from the drive sheave.

11. The method of claim 10 further comprising disposing a position limiter against the belt close to the exit point.

12. The method of claim 10 wherein the minimal friction is provided by a friction reducing coating on one of the belt and the at least one drive pulley.

13. The method of claim 12 wherein the friction reducing coating is polytetrafluoroethylene.

14. The method of claim 10 wherein the minimal friction is provided by minimizing the amount of wrap of the belt around the drive pulley.

15. The method of claim 10 wherein the minimal friction is provided by minimizing surface contact between the belt and the drive pulley.

* * * * *